United States Patent Office 3,416,547
Patented Dec. 17, 1968

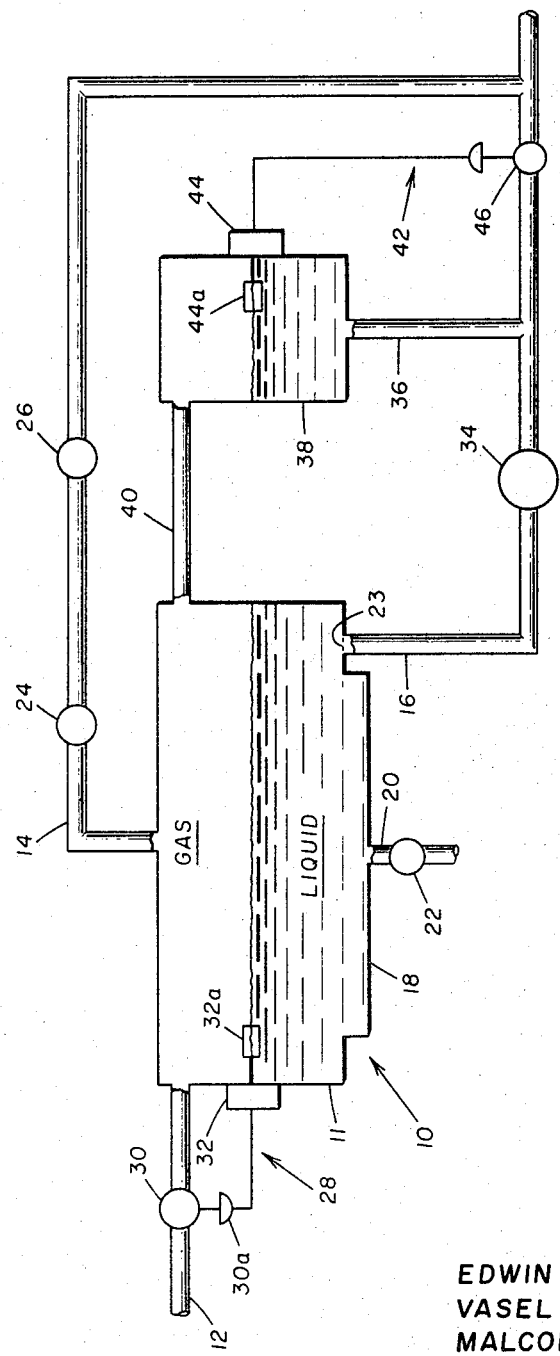

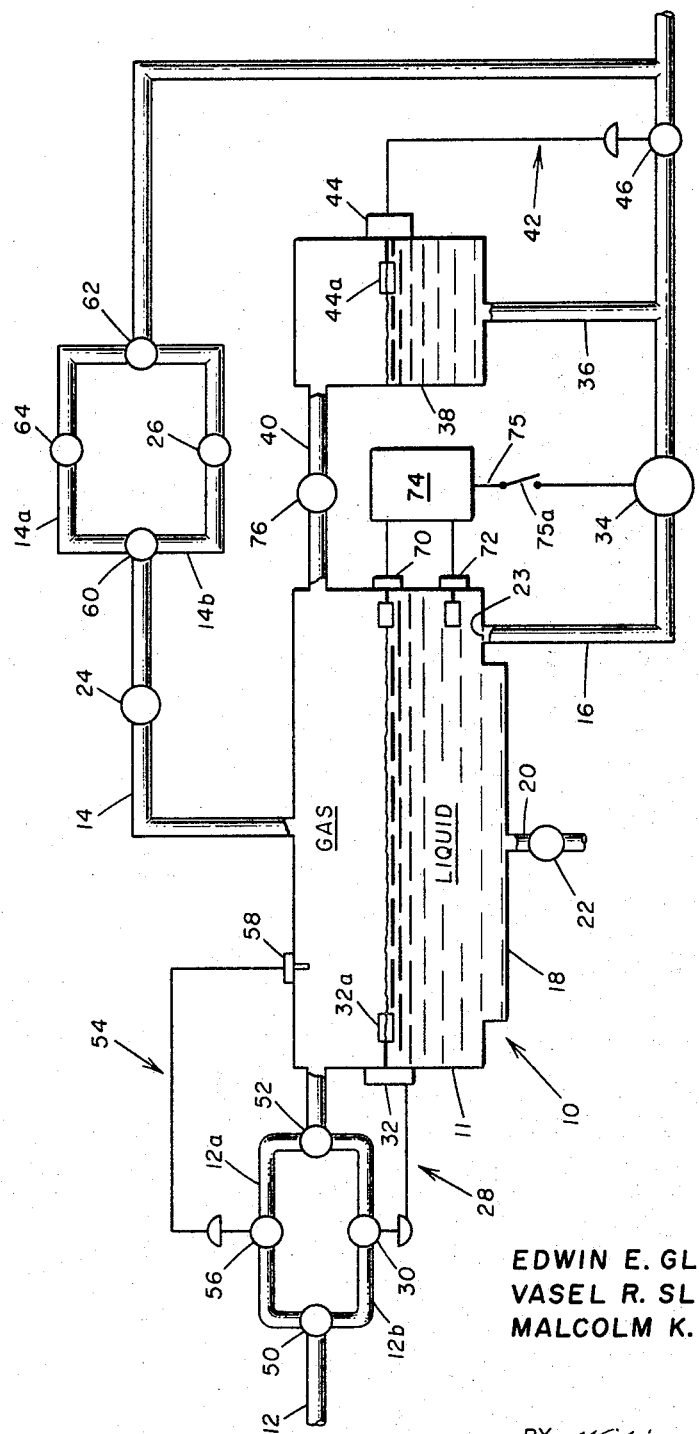

3,416,547
SEPARATING FLOW CONTROL SYSTEM
AND METHOD
Edwin E. Glenn, Jr., Dallas, and Vasel R. Slover, Jr.,
and Malcolm K. Strubhar, Irving, Tex., assignors to
Mobil Oil Corporation, a corporation of New York
Filed June 6, 1966, Ser. No. 555,369
9 Claims. (Cl. 137—12)

ABSTRACT OF THE DISCLOSURE

A method and apparatus for controlling the flow of a multicomponent fluid stream in order to achieve a specified flow rate of one component thereof wherein said stream is passed into a separator where it is separated into its components. One of the components is withdrawn from said separator at said specified rate and the flow of the fluid stream into the separator is regulated in response to the withdrawal of one said component.

---

This invention relates to the control of multicomponent fluid streams, and more particularly to a method and apparatus for controlling a multicomponent fluid stream in order to achieve a specified flow rate of one component thereof.

In the oil industry, it often is desirable to measure the amount of fluid being produced from an oil or gas well. Also, particularly in the testing of such a well, it is desirable to control the flow at some specified rate within close tolerances while at the same time obtaining pressure data for the well, usually over a specified time period. The pressure-rate-time data then may be used to compute certain characteristics of the oil and/or gas bearing formation penetrated by the well. Such characteristics include the permeability of the formation and the skin effect or damage to the formation occurring during completion or production of the well.

Due to the multiphase character of the production effluent from, for example, an oil well, difficulty is involved in accurately measuring and controlling the flow rate thereof. Certain high quality positive displacement meters and also mass flow rate meters are quite accurate in measuring single phase flow. However, in multiphase gas and liquid flow, the available flow rate meters oftentimes do not provide the high degree of accuracy required in obtaining well test data.

In view of the difficulties involved in the continuous type flow meters described above, it has been proposed to utilize test separating systems in which the flow rate of the liquid phase in a fluid stream is measured through the use of dump meters. The typical dump meter comprises a tank with liquid-level sensing means installed near the top and bottom thereof. The liquid-level sensing devices are connected through a suitable control circuit so as to actuate valves in the inlet and outlet lines of the tank, such that the tank is repeatedly filled and emptied between the top and bottom level sensing devices. The tank is calibrated so that a definite known quantity of liquid is "dumped" each time the tank is emptied. Dump type meters thus measure the liquid flow in increments and therefore are not satisfactory for providing the continuous flow rate data often needed for the analysis of well tests.

In accordance with the instant invention, there is provided a method and apparatus for controlling the flow rate of a multicomponent fluid stream such as a fluid stream comprising gas and liquid phases to achieve a specified flow rate of one component of the fluid and also if desired measuring the flow rate for the several components of the fluid stream. Thus, knowing the flow rates of the separate components of the stream, the total flow rate can be determined.

In carrying out the method of the instant invention, the multicomponent fluid stream is passed to a separating zone wherein the fluid is separated into a plurality of components thereof. One of the components is withdrawn from the separating zone at a specified rate and the flow of the multicomponent fluid stream to the separating zone is controlled such that this one component contained in the fluid stream is introduced to the separating zone at this specified rate.

In a preferred embodiment of the invention, there is provided a method for testing a well, the production effluent of which comprises gas and liquid phases. The production effluent from the well is passed to a gas-liquid separating zone within which the production effluent is separated into separate gas and liquid fluid phases. One of the separate gas and liquid phases is withdrawn from the separating zone at a specified rate and the flow rate of the production effluent to the separating zone is controlled such that this phase contained in the production effluent is introduced to the separating zone at this same specified rate. Where the liquid phase is withdrawn from the separating zone at a controlled rate, the amount of liquid within the zone is sensed and the introduction of production effluent to the separating zone is controlled such that the amount of liquid within the zone is maintained substantially constant. Where the gas phase is withdrawn from the separating zone at a specified rate, the gas pressure within the zone is sensed and the input of production effluent to the separating zone is controlled in order to maintain the gas pressure within the zone substantially constant. In either case, the flow rate of the production effluent to the separating zone, and therefore the production rate of the well, is regulated such that either the gas or liquid phase within the production effluent is maintained at the desired flow rate.

In another aspect of the invention, there is provided a separating flow control system which comprises separating means having an inlet for the passage of a multicomponent fluid stream thereto and an outlet for the passage of one of the components of the fluid from the separating means. Means are provided for controlling the withdrawal of this component through the outlet at a specified rate. This system also comprises means for controlling the introduction of the multicomponent fluid through the inlet of the separating means such that this component contained in the fluid stream is introduced to the separating zone at the aforementioned specified rate.

In a preferred embodiment of this aspect of the invention, there is provided a phase separator for separating a fluid into a plurality of separate phases thereof. The phase separator comprises a separator vessel having a first outlet for the passage of one of the fluid phases from the vessel and a second outlet for the passage of another of the fluid phases from the vessel. First flow control means in fluid communication with one of these outlets is provided for controlling the flow of its respective fluid phase through this outlet at a specified rate. Second control means is provided which is in fluid communication with the inlet. The second control means includes means responsive to a differential between the introduction of fluid to the separator and the withdrawal of the above-noted respective fluid phase through the outlet for controlling the introduction of the multiphase fluid at a rate such that the aforementioned respective fluid phase contained in the fluid stream is introduced to the separator at the specified rate.

In an embodiment of this system hereinafter disclosed, the phase separator comprises a gas-liquid separator vessel having on of the aforementioned outlets adapted for the withdrawal of liquid from the separator and the other outlet adapted for the withdrawal of gas from the separator. The aforementioned second control means includes flow regulating means in fluid communication with the inlet of the separator vessel and level sensing means for sensing the liquid level in the vessel and adjusting the flow regulating means for increased fluid flow through the inlet in response to a decrease in liquid level and decreased fluid flow through the inlet in response to an increase in the liquid level. Thus, a specified rate of liquid input into the separator is maintained even through the relative amount of liquid within the input stream varies.

For a better understanding of the present invention, reference may be had to the following detailed description taken in conjunction with the accompanying drawings in which:

FIGURE 1 is a schematic illustration of one embodiment of the invention; and

FIGURE 2 is a schematic illustration of another embodiment of the invention.

Turning first to FIGURE 1, there is shown a separating and flow control system for controlling and monitoring the flow rate of a gas and liquid phase stream from a suitable source such as an oil well. The fluid stream from the well is controlled such that the well production is regulated to produce a liquid flow at some desired specified rate. The specified rate is usually a constant rate maintained over a suitable time interval, e.g., six hours or more, although this embodiment may be utilized to maintain a varying flow rate over some time interval. In the embodiment shown in FIGURE 1, the rate of liquid withdrawal from the separator is controlled by means of a suitable pump installed in the outlet line of the separator. The system also is provided with means for maintaining a suitable back pressure on the outlet of the pump, and for varying this back pressure directly with the pressure on the inlet of the pump in order to maintain a substantially constant pressure drop across the pump and to minimize this pressure drop. Thus, the pump will function to withdraw liquid from the separator at an extremely accurate controlled rate.

More particularly, and with reference to FIGURE 1, there is shown a gas-liquid separator 10 comprising a separator vessel 11 having an inlet line 12, a gas outlet line 14, and a liquid outlet line 16. The gas separator 10 is of the so-called "flash separation" type in which a gas-liquid mixture upon entering the vessel 11 through the inlet expands, thereby liberating gas from solution in the liquid. The gas occupies the upper portion of the separator vessel 11 as shown and the liquid occupies the lower portion thereof. The separator vessel 11 is provided with a recessed trap portion 18 within which debris, such as sand or other particulate material entrained within the incoming fluid, may collect. A suitable drainage outlet 20 with a normally closed valve 22 therein may be provided for periodically clearing the separator vessel of accumulated debris. The liquid outlet from vessel 11 also is provided with a suitable screen 23 in order to restrict the passage of particulate material through the outlet.

The gas outlet line is provided with a suitable gas metering device 24. Metering device 24 preferably is of any suitable type, such as an orifice meter, which measures and records the gas flow rate through an orifice plate in line 14. However, device 24 may be a cumulative type meter which merely records the cumulative volume of gas withdrawn through line 14 in any convenient unit. Downstream of meter 24 the outlet line 14 is provided with a back pressure control valve 26 which may be adjusted to control the operating pressure in the separator at any desired value within a suitable range, for example, a range of 0 p.s.i. gauge (atmospheric pressure) to 300 p.s.i. gauge.

The inlet line 12 is provided with fluid flow control means 28 which is responsive to any differential between the rate of introduction of liquid through the inlet 12 and the withdrawal of liquid through the outlet 16 and controls the ingress of fluid to the separator at a rate such that the liquid contained therein is introduced into the separator at the same rate at which liquid is withdrawn therefrom. The control means 28 comprises a diaphragm operated flow regulating valve 30 and liquid-level sensing means 32 which functions to adjust valve 30 for the regulation of fluid flow therethrough. Device 32 comprises a float 32a which acts to generate a function representative of the liquid level within vessel 11 and to which valve 30 responds. For example, float 32a may act to control electrically a pilot valve (not shown) which in turn acts to control the supply of air or other suitable operating gas from a source (not shown) to the diaphragm head 30a of the regulating valve 30. The open flow area through valve 30 of course depends upon the pressure in diaphragm head 30a as will be understood by those skilled in the art.

It will be recognized that other suitable inlet flow control means may be utilized in the present invention. For example, the amount of liquid within the vessel may be determined by acoustic or capacitance-probe type liquid-level sensing means. However, a float type control such as that shown usually will be preferred for purposes of simplicity and reliability. Also, it will be recognized that float 32a may be mounted exteriorly of the vessel 11 in order to avoid any inaccuracy due to turbulent motion of the liquid level in the vessel. For example, float 32a may be mounted in a sight gauge line connected to the vessel at points above and below the normal liquid level.

The outlet line 16 is provided with a variable speed pump 34, preferably of the positive displacement type, which functions to control the withdrawal of liquid from the separator at any specified rate within a suitable range. As will be explained hereinafter, the pump 34 may be calibrated in terms of output rate versus pump speed in order to provide a metering function as well as a control function. At a point downstream of the pump 34, the outlet line 16 is connected with a stand pipe 36 leading to a vessel 38 which is adapted to contain fluid, thereby imposing a back pressure on the pump 34 and minimizing the pressure drop across the pump. The vessel 38 is provided with means for varying the gas pressure therein directly with a change in the gas pressure within the separator 10. As shown in the drawing, this preferably takes the form of a gas line 40 interconnecting the gas zone of vessel 11 and the gas zone of vessel 38 so that the same gas pressure is maintained in both vessels. The vessel 38 also is provided with suitable means 42 for maintaining a substantially constant level of liquid therein. This means as shown in FIGURE 1 comprises a liquid-level sensing device 44 with a float 44a and a flow regulating diaphragm valve 46 positioned in the discharge line of the pump 34 at a point downstream of the interconnection between the discharge line and the stand pipe 36. The level sensor 44 and valve 46 may be the same as those comprising the inlet control means 28, although the operation of valve 46 in response to the position of float 44a is reversed as will be apparent from the following description of operation.

The various component parts of the system shown in FIGURE 1 may be of any suitable kind which perform the desired functions in the operation of the system. The following specific elements are exemplary of components which have been found to be satisfactory.

The flow regulating valves 30 and 46 including the diaphragm heads may be obtained from the Fisher Governor Co., Marshalltown, Iowa, as their Model No. 125P. Suitable level sensing devices 32 and 44, including the float and attendant air pilot valve, are available from the W. C. Norris Division, Dover Corporation, Houston, Texas, as their Series 1000 Level Controls.

The back pressure regulating valve 26 may be a Fisher

Governor Co. Model 125P valve equipped with a Fisher Governor Co. Model 4100 pressure sensor and controller. This pressure controller is, of course, connected in line 14 immediately upstream of the valve. The gas flow meter 24 may be of the type manufactured by The Foxboro Co., Foxboro, Massachusetts, and available as their Model No. 37.

The pump 34 may be a variable displacement rotary positive displacement pump which is available from Blackmer Pump Co., Grand Rapids, Michigan, and identified as Model VX. The prime mover for the pump may be a variable speed electric motor.

Before utilizing the system in FIGURE 1 in the control and monitoring of a fluid stream such as in the testing of an oil well, it will be desired to calibrate the pump 34 on the basis of pump speed and flow rate. This may be accomplished by manually closing valve 46 and then pumping liquid from vessel 11 to vessel 38 and measuring the time required for a known amount of liquid to accumulate within vessel 38.

The operation of the control system shown in FIGURE 1 is as follows. A fluid stream such as the production effluent from an oil well under test enters the separator vessel 11 through inlet 12. As the gas entrained in the oil expands upon entry into the separator vessel, it is liberated therefrom and occupies the upper portion of the vessel 11. The separate gas phase flows from the separator through outlet 14 and passes through metering device 24 and back pressure regulating device 26. The liquid phase comprising oil, and in the present embodiment water if any is present in the production effluent, is removed from the separator via outlet line 16 through the action of the pump 34. As noted previously, the pump 34 may be calibrated such that operation of the pump at a known speed will produce a known flow rate so that the pump functions to meter as well as control the withdrawal of liquid from the separator vessel. In most cases, the pump will be operated at a constant speed over a suitable time interval in order to remove liquids from the separator at a constant rate.

If the liquid contained in the fluid stream enters the separator faster than liquid is being removed therefrom, the liquid level within the vessel 11 will begin to rise. This rise in liquid level will be sensed by means 32 due to movement of float 32a. Upon sensing an increase in liquid level, the level sensing means 32 will signal the inlet regulating valve 30 and valve 30 will respond thereto by closing some amount, thus reducing the rate of introduction of fluid through inlet 12 Conversely, if pump 34 is acting to withdraw liquid from the separator vessel 11 faster than it is being introduced, the liquid level will begin to fall, upon which the control valve 30 will respond to a signal from sening device 32 and open somewhat, thus allowing liquid to enter the separator at a faster rate. Thus, it can be seen that a substantially constant rate of liquid production from the well can be maintained even though the liquid-gas ratio of the production effluent may vary over a wide range.

The regulating valve 46 in line 16 functions under the control of sensing means 44 to maintain a portion of the liquid discharged from pump 34 at a desired level in vessel 38. Should the liquid level in vessel 38 start to fall below its desired position, the sensing means will signal the valve to close a small amount, thus further restricting liquid flow therethrough and forcing liquid into vessel 38 as necessary to maintain the desired level. In a like manner, regulating valve 46 will respond to a rising liquid level as sensed by float 44a by opening as necessary to maintain the liquid at the desired level.

The vessel 38 and its attendant control equipment function to maintain a substantially constant and if desired a relatively minimum pressure drop across the pump. This allows the pump to operate at a relatively constant and high level of efficiency and insures that for any given constant pump speed the flow rate through the pump will be constant within a very low tolerance range. The liquid-level control device 44 may be set to maintain the liquid level within the vessel 38 at any desired level, although preferably the level within vessel 38 will be maintained at a level not greater than the liquid level within separator vessel 11. Usually the level of the liquid within vessel 38 will be maintained at substantially the same level as the liquid within separator vessel 11. Thus, the hydrostatic heads imposed upon the inlet and outlet sides of the pump will be substantially the same. It will be recognized, however, that if it is desired to increase the pressure differential across pump 34, level control means 44 may be positioned such as to maintain the liquid within vessel 38 at some level below the level in vessel 11.

As noted previously, the gas flow line 40 functions to equalize the gas pressure within the vessels 11 and 38. That is, the gas pressure within vesssel 38 will be the same as the operating pressure within separator vessel 11 neglecting the pressure loss due to gas flow through line 40.

In some instances, the gas flow line 40 may be unnecessary. For example, where the gas separator is operating at a very low pressure, the pressure exerted on the input side of the pump will be due largely to the hydrostatic head of liquid within separator vessel 11. In this case, gas flow line 40 may be dispensed with. Conversely, where the separator is operated under a very high pressure, e.g., on the order of 300 pounds or more, most of the pressure exerted on the input side of pump 34 will be due to the gas pressure within the separator. In this case, the level control means 42 for vessel 38 may be eliminated since the hydrostatic pressure on pump 34 is only a very small part of the total pressure exerted thereon. It will be recognized, however, that in this case some gas will flow through line 40 and line 36 and into the outlet line 16, thus by-passing metering device 24. For this reason, it usually will be preferred to maintain a level of liquid within vessel 38 such as is shown.

Turning now to FIGURE 2, there is shown a modified form of the control system in which the fluid stream flowing through inlet line 12 may be regulated on the basis of the gas phase or the liquid phase. The system shown in FIGURE 2 is in many respects ssimilar to that shown in FIGURE 1 and like elements will be identified by the reference numerals used in FIGURE 1.

With reference to FIGURE 2, the system shown therein is provided with branch lines 12a and 12b connected in the inlet line 12 through a pair of three-way valves 50 and 52. Branch line 12b is provided with flow control means 28 and branch line 12a is provided with flow control means 54 comprising a flow regulating valve 56 and a pressure sensing and control means 58. The flow control means 54 functions similarly as the control means 28 as described above except that here valve 56 regulates fluid flow to the separator vessel 11 in response to the pressure within the vesssel. For example, pressure sensing means 58 will sense the pressure within the separator decreasing from some desired level and signal valve 56 to open as necessary to increase the flow rate therethrough and maintain the pressure at the desired level. Conversely, in response to sensing means 58 sensing an increase in pressure, the valve 56 will close as necessary to reduce the fluid flow through the inlet to maintain the pressure at the desired level. The control means 54 thus acts as a forward presssure regulator which functions to control the operating pressure in the separator vessel at a substantially constant value. Valve 56 may be a diphragm operated valve similarly as valve 30 and pressure sensing means 58 may be of the type available from Fisher Governor Co. as Model No. 4100.

The system in FIGURE 2 also includes branch lines 14a and 14b connected in the gas outlet line 14 through a pair of three-way valves 60 and 62. The branch line 14b is provided with back pressure valve 26 and the by-pass line 14a is provided with a constant flow controller 64 of any suitable type. For example, controller 64 may comprise a valve, an orifice, and differential pressure control means for sensing the pressure drop across the orifice and regulating the valve in response thereto. The controller 64 functions such that if the pressure drop across the orifice increases above the level corresponding to a desired flow rate, the valve closes somewhat in order to reduce the flow rate through outlet line 14. Conversely, if the pressure drop across the orifice decreases, the valve is opened by an amount necessary to bring the pressure drop up to the level at which gas flow through the line is at the desired rate. A suitable constant flow controller of the above-described type may be comprised of a Fisher Governor Co. Model 125P valve which is controlled by a differential pressure controller available from Barton Instrument Co., Monterey Park, California, as Model No. 237.

From the above description it will be recognized that valves 50 and 52 provide switch means for selecting one of the control means 28 and 54 to regulate fluid flow through inlet 12 such that either the liquid phase or the gas phase in the input stream is introduced to the separator vessel at the desired specified rate. Similarly, valves 60 and 62 provide switch means for selecting one of the controllers 26 and 64 to regulate gas flow from the separator vessel so as to achieve either a desired operating pressure within the vessel or a desired gas flow rate from the vessel. However, it is to be recognized that such switch means may be formed by the provision of only a single flow regulating valve in each of the inlet and outlet lines 12 and 14 and suitable means for selectively placing these valves under the control of the appropriate sensing means. For example, the inlet line may be provided with a single valve located such as valve 30 in the embodiment of FIGURE 1 and which may be selectively placed under the control of one of sensing means 32 and 58. Similarly, the outlet line 14 may be unbranched as shown in FIGURE 1 and provided with a single diaphragm valve therein which may be selectively placed under the control of a pressure controller in order to maintain a constant back pressure on the separator vessel or under the control of a differential pressure controller in order to maintain a constant flow rate through the gas outlet line. Also, in this case the additional pressure controller 58 may be dispensed with and the pressure controller located in the outlet line 14 may be used for control of the valve in the inlet line 12 when it is desired to regulate fluid flow to the separator vessel as necessary to introduce the gas phase at the desired rate. In this regard, it will be recognized that the pressure in the outlet line 14 will be equal to the pressure within vessel 11 less the pressure loss due to flow through the line.

When the embodiment shown in FIGURE 2 is utilized to control the flow rate through inlet 12 on the basis of the gas phase, it will be recognized that a constant gas flow rate under conditions of a varying gas-liquid ratio will result in liquid being introduced to the separator at a variable rate. For example, should the relative amount of gas in the incoming feed-stream decrease, the total fluid flow rate to the separator will be increased in order to maintain the gas phase rate constant. Thus, the liquid will enter the separator vessel 11 at an increased rate.

In view of this variable liquid flow rate, liquid is not withdrawn continuously from the separator, but instead the separator is emptied periodically by pump 34. In this regard, the separator vessel 11 is provided with high level and low level float controls 70 and 72, respectively, which act through a control circuit 74 to operate pump 34. Control circuit 74 may be of any suitable design as will be readily apparent to those skilled in the art. For example where pump 34 is driven by an electric motor, control circuit may be of any type utilized in conventional dump meters except that it acts to energize the pump motor rather than a motor valve in the outlet line. The vessel is calibrated as to the volume between floats 70 and 72 and the control circuit 74 may be provided with a conventional cumulative counter (not shown) which will record the total volume of liquid which passes through vessel 11 in any desired time interval. The operative connection between the control circuit and the pump, shown schematically in the drawing by line 75, may be provided with suitable switch means 75a. When the liquid level within the separator vessel 11 builds up to the level of float 70, this control operates through control circuit 74 to start pump 34. The pump thereupon withdraws liquid from the separator vessel 11 until the liquid level therein reaches the position of float 72. This control then acts through the control circuit 74 to de-energize pump 34 whereupon the liquid within the vessel 11 will accumulate until it again reaches the level of float 70 at which time the pump 34 again will be activated.

The gas flow line 40 is provided with a valve 76. In the event the function of vessel 38 and its attendant control system is not desired during operation of the system to control fluid flow on the basis of the gas phase flow rate, valve 76 may be closed and valve 46 may be opened manually and removed from control of the level sensing means 44.

In the operation of the system shown in FIGURE 2 to achieve a constant gas flow rate, valves 50 and 52 are turned to positions directing the incoming fluid stream through inlet branch line 12a. Thus, flow regulating valve 30 is functionally removed from the inlet flow line and all of the fluid input passes through control valve 56. In a similar manner, valves 60 and 62 are turned to positions at which gas flow through line 14 passes through branch line 14a. Thus the back pressure valve 26 is functionally removed from the gas outlet line 14 and replaced by constant flow controller 64. At the same time, pump 34 is placed under control of the operating circuit 74 by closing switch means 75a, and if desired valve 76 may be closed and valve 46 removed from the control of the liquid-level sensing means 44. The above operations may be performed manually. However, it will be recognized by those skilled in the art that the above operations may be carried out automatically through the use of power operated valves, e.g., solenoid actuated valves, and the appropriate automatic control circuitry.

From the above description, it will be recognized that the system shown in FIGURE 2 now may be utilized to control the output of a gas well such that the gas phase in the production effluent is maintained at a substantially constant specified rate. The gas flow rate is measured by means of gas meter 24 as described before, and the total cumulative liquid production is measured by the dump type action of vessel 11. The system of FIGURE 2 may be utilized to control the rate of the feedstream on the basis of its liquid phase by the opening of switch 75a and the proper manipulation of the several valves so that the system is functionally the same as that shown in FIGURE 1. The operation of the system of course then will be identical to that described above with reference to FIGURE 1.

Having described certain specific embodiments of the instant invention, it will be understood that further modifications thereof may be suggested to those skilled in the art, and it is intended to cover all such modifications as fall within the scope of the appended claims.

What is claimed is:

1. In a separating flow control system, the combination comprising:
   a phase separator for separating a multiphase fluid into its liquid and gas phases, said separator comprising a vessel having an inlet for the passage of said fluid to said vessel, a first outlet adapted for withdrawal of said gas phase, and a second outlet adapted for the withdrawal of said liquid phase;
   inlet flow control means including flow regulating means in fluid communication with said inlet and responsive to the liquid level in said vessel to increase fluid flow through said inlet in response to a decrease in said liquid level and decrease fluid flow through said inlet in response to an increase in said liquid level;

a pump means connected in said second outlet for withdrawing liquid from said separator at a specified rate; and a second vessel fluidly connected to said second outlet at a point downstream of said pump means, said second vessel adapted to contain liquid whereby a back pressure is exerted on the outlet of said pump means and the pressure drop across said pump means is minimized, means for varying the gas pressure within said second vessel directly with a change in the gas pressure within said separator vessel.

2. The system of claim 1 wherein said last-named means comprises a gas flow line interconnecting said separator vessel and said second vessel.

3. In a separating flow control system, the combination comprising:

a phase separator for separating a multiphase fluid into its gas phases, said separator comprising a vessel having an inlet for the passage of said fluid to said vessel, a first outlet adapted for withdrawal of said gas phase, and a second outlet adapted for the withdrawal of said liquid phase;

inlet flow control means including flow regulating means in fluid communication with said inlet and responsive to the liquid level in said vessel to increase fluid flow through said inlet in response to a decrease in said liquid level and decrease fluid flow through said inlet in response to an increase in said liquid level;

a pump means connected in said second outlet for withdrawing liquid from said separator at a specified rate; and a second vessel fluidly connected to said second outlet at a point downstream of said pump means, said second vessel adapted to contain liquid whereby a back pressure is exerted on the outlet of said pump means and the pressure drop across said pump means is minimized, wherein said last-named means comprises flow regulating means in said discharge line downstream of the fluid interconnection of said second vessel with said discharge line and level sensing means for sensing a change in the liquid level within said second vessel and adjusting said flow regulating means for increased flow therethrough in response to an increase in said liquid level and decreased flow therethrough in response to a decrease in said liquid level.

4. The system of claim 3 further comprising means for varying the gas pressure within said vessel directly with a change in the gas pressure within said separator vessel.

5. The system of claim 4 wherein said last-named means comprises a gas flow line interconnecting said separator vessel and said second vessel.

6. In a separating flow control system, the combination comprising:

a gas-liquid separator, said separator comprising a vessel having an inlet, a first outlet for the withdrawal of gas from said separator and a second outlet for the withdrawal of liquid from said separator;

first inlet flow control means for controlling the flow of fluid on the basis of the gas phase thereof, said first flow control means allowing for increased fluid flow in response to a decrease in gas pressure within said vessel and decreased fluid flow in response to an increase in gas pressure within said vessel;

second inlet flow control means for controlling the flow of fluid on the basis of the liquid phase thereof, said second flow control means allowing for increased fluid flow in response to a decrease in the liquid level in said vessel and decreased fluid flow in response to an increase in the liquid level in said vessel;

switch means for selecting one of said inlet control means to regulate fluid flow to said separator vessel;

and first and second outlet flow control means for controlling respectively the gas flow from said separator at a specified rate when said first inlet flow control means is selected by said switch means and the liquid flow from said separator at a specified rate when said second flow control means is selected by said switch means.

7. In a method of controlling the flow rate of a multiphase gas-liquid fluid stream to achieve a specified flow rate of the gas phase thereof, the steps comprising:

passing said fluid stream into a separating zone and within said zone separating said fluid into its liquid and gas phases;

withdrawing said gas phase from said separating zone at said specified rate;

sensing the pressure in said separating zone due to the gas phase; and controlling the flow of said fluid stream into said separating zone in response to said sensed pressure to maintain said pressure in said separating zone substantially constant.

8. In a separating flow control system, the combination comprising:

a phase separator for separating a multiphase fluid into its liquid and gas phases, said separator comprising a vessel having an inlet for the passage of said fluid to said vessel, a first outlet adapted for the withdrawal of said gas phase and a second outlet adapted for the withdrawal of said liquid phase;

outlet flow control means in said first outlet for controlling the withdrawal of said gas phase from said separator at a specified rate; and means in fluid communication with said inlet and responsive to the pressure of the gas phase within said separator for increasing flow of fluid through said inlet when said pressure decreases and decreasing flow of fluid through said inlet when said pressure decreases.

9. The system of claim 8 including:

outlet flow control means fluidly communicating with said second outlet and responsive to the level of the liquid phase within the separator for allowing flow of liquid through said second outlet when the liquid phase rises in said separator and preventing flow of liquid through said second outlet when the liquid phase drops in said separator.

References Cited

UNITED STATES PATENTS

| | | | |
|---|---|---|---|
| 2,226,097 | 12/1940 | Happel | 73—200 X |
| 2,306,606 | 12/1942 | Hirsch | 73—200 X |
| 3,202,167 | 8/1965 | De Young | 137—173 |

ALAN COHAN, *Primary Examiner.*

U.S. Cl. X.R.

137—210, 171, 391; 55—166, 167

UNITED STATES PATENT OFFICE
CERTIFICATE OF CORRECTION

Patent No. 3,416,547                          December 17, 1968

Edwin E. Glenn, Jr., et al.

It is certified that error appears in the above identified patent and that said Letters Patent are hereby corrected as shown below:

Column 2, line 71, "on" should read -- one --. Column 3, line 12, "through" should read -- though --. Column 6, line 43, "ssimilar" should read -- similar --. Column 9, line 24, after "its" insert -- liquid and --; line 44, before "wherein" insert -- means for maintaining a substantially constant level of liquid within said second vessel, --.

Signed and sealed this 17th day of March 1970.

(SEAL)
Attest:

Edward M. Fletcher, Jr.                  WILLIAM E. SCHUYLER, JR.
Attesting Officer                             Commissioner of Patents